(12) United States Patent
Monfredini et al.

(10) Patent No.: US 12,296,565 B2
(45) Date of Patent: May 13, 2025

(54) PLANT AND METHOD FOR LAMINATING CORRUGATED CARDBOARD

(71) Applicant: TECNOMAC S.R.L., Bordolano (IT)

(72) Inventors: Stefano Monfredini, Bordolano (IT); Giuseppe Tornetti, Bordolano (IT)

(73) Assignee: TECNOMAC S.R.L., Bordolano (IT)

( * ) Notice: Subject to any disclaimer, the term of this patent is extended or adjusted under 35 U.S.C. 154(b) by 328 days.

(21) Appl. No.: 17/908,520

(22) PCT Filed: Feb. 15, 2021

(86) PCT No.: PCT/IB2021/051242
§ 371 (c)(1),
(2) Date: Aug. 31, 2022

(87) PCT Pub. No.: WO2021/181180
PCT Pub. Date: Sep. 16, 2021

(65) Prior Publication Data
US 2023/0158787 A1    May 25, 2023

(30) Foreign Application Priority Data

Mar. 11, 2020  (IT) .................. 102020000005215

(51) Int. Cl.
*B32B 41/00* (2006.01)
*B32B 29/08* (2006.01)
(Continued)

(52) U.S. Cl.
CPC .......... *B32B 29/08* (2013.01); *B32B 37/0053* (2013.01); *B32B 37/1207* (2013.01);
(Continued)

(58) Field of Classification Search
CPC . B32B 29/08; B32B 37/0053; B32B 37/1207; B32B 37/203; B32B 38/1833;
(Continued)

(56) References Cited

U.S. PATENT DOCUMENTS

2020/0009848 A1    1/2020   Meckelein et al.

FOREIGN PATENT DOCUMENTS

DE    102009058334 A1    6/2011
EP        0618071 A1    10/1994
(Continued)

OTHER PUBLICATIONS

European Patent Office, International Search Report issued in PCT/IB2021/051242, mailed Jul. 27, 2021, Rijswijk, NL.
(Continued)

*Primary Examiner* — Michael N Orlando
*Assistant Examiner* — Joshel Rivera
(74) *Attorney, Agent, or Firm* — Ferguson Case Orr Paterson

(57) ABSTRACT

A plant for laminating cardboard, and in particular corrugated cardboard, by an adhesive plastics film, is provided. The plant has a supply station configured to supply a succession of single rough cardboard sheets in a feeding direction, an application station arranged in the sheet feeding direction and having an application roller configured to unwrap and apply the adhesive plastics film to a rough cardboard sheet so that the adhesive plastics film adheres to each rough cardboard sheet of the succession of rough cardboard sheets to form a succession of coated cardboard sheets and to advance each coated cardboard sheet of the succession of coated cardboard sheets in the feeding direction. A method for laminating cardboard, and in particular corrugated cardboard, using an adhesive plastics film is also provided.

22 Claims, 5 Drawing Sheets

(51) Int. Cl.
  *B32B 37/00* (2006.01)
  *B32B 37/12* (2006.01)
  *B32B 37/20* (2006.01)
  *B32B 38/18* (2006.01)
  *B32B 39/00* (2006.01)
  *B32B 43/00* (2006.01)

(52) U.S. Cl.
  CPC ........ *B32B 37/203* (2013.01); *B32B 38/1833* (2013.01); *B32B 39/00* (2013.01); *B32B 43/003* (2013.01); *B32B 2037/1223* (2013.01); *B32B 2317/127* (2013.01)

(58) Field of Classification Search
  CPC .................. B32B 39/00; B32B 43/003; B32B 2037/1223; B32B 2317/127; B32B 27/10; B32B 41/00; B32B 38/0004; B32B 38/105; B32B 2439/70; B32B 37/223; B65H 2301/51614; B65H 2301/5162; B65H 2701/131; B65H 2701/1762; B65H 19/123; B65H 35/06; B26D 1/405; B26D 5/32; B26D 7/32
  USPC .................... 156/60, 64, 350, 351, 378, 379
  See application file for complete search history.

(56) References Cited

FOREIGN PATENT DOCUMENTS

EP         3466645 A1     4/2019
GB        2228255 A      8/1990

OTHER PUBLICATIONS

European Patent Office, Written Opinion issued in PCT/IB2021/051242, mailed Jul. 27, 2021, Rijswijk, NL.

PLANT AND METHOD FOR LAMINATING CORRUGATED CARDBOARD

CROSS-REFERENCE TO RELATED APPLICATIONS

This application is a National Phase Application of PCT International Application No. PCT/IB2021/051242, having an International Filing Date of Feb. 15, 2021 which claims the benefit of priority to Italian Patent Application No. 102020000005215, filed Mar. 11, 2020, each of which is hereby incorporated by reference in its entirety.

FIELD OF THE INVENTION

The present invention relates to a plant for laminating cardboard, and in particular for laminating corrugated cardboard.

BACKGROUND OF THE INVENTION

Corrugated cardboard is particularly used to manufacture various types of packaging. In this case, it concerns the production of display cabinets for products for sale. Such display cabinets, in addition to having a shape adapted to contain and display the products, also have a marketing function, therefore they are usually printed with the colors and the logos of the manufacturers of such products. A further use of corrugated cardboard concerns the production of food containers.

Manufacturing such display cabinets by printing a sheet of paper according to the required graphics is known. Subsequently, such sheet is laminated and then applied on top of the corrugated cardboard.

The cardboard is then cut, folded, glued and finished to form the desired display cabinet.

Such known methods for laminating corrugated cardboard display cabinets still have numerous disadvantages, and in particular they are laborious and expensive.

Attempts have been made to carry out the lamination of corrugated cardboard through the known lamination plants, although, current technologies involve an inevitable and considerable damage of the final product.

In fact, the working pressures implemented by such plants, necessary to obtain a good coupling between the plastic coating and the cardboard, tend to almost flatten the waves of the corrugated cardboard completely.

SUMMARY OF THE INVENTION

It is therefore the object of the present invention to provide a plant for laminating cardboard, and in particular corrugated cardboard, so as to obviate at least some of the drawbacks highlighted in the prior art.

It is a particular object of the present invention to provide a plant for laminating cardboard, and in particular corrugated cardboard, which carries out such lamination in a manner which does not damage the product, is more efficient, quick and cost effective.

These and other purposes are achieved by a plant for laminating cardboard as described and claimed herein.

Dependent claims relate to preferred and advantageous embodiments.

BRIEF DESCRIPTION OF THE FIGURES

Further features and advantages of the present invention will become more apparent from the description of some preferred embodiments thereof, given below by way of non-limiting example with reference to the accompanying drawings, in which.

DETAILED DESCRIPTION

Figure 1:
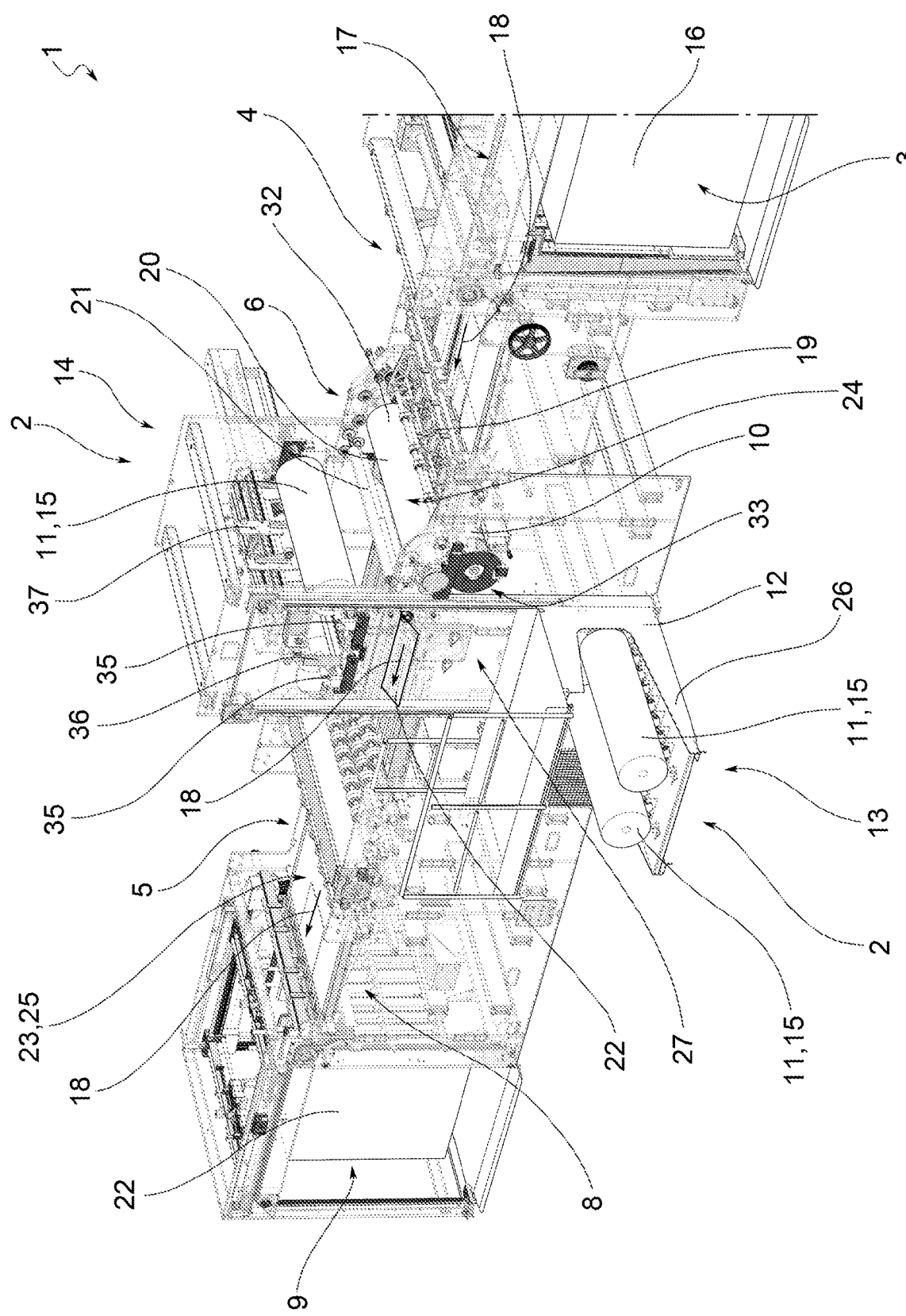
FIG. 1 shows a partial perspective view of a plant for laminating cardboard, according to an embodiment of the invention.
Figure 2:
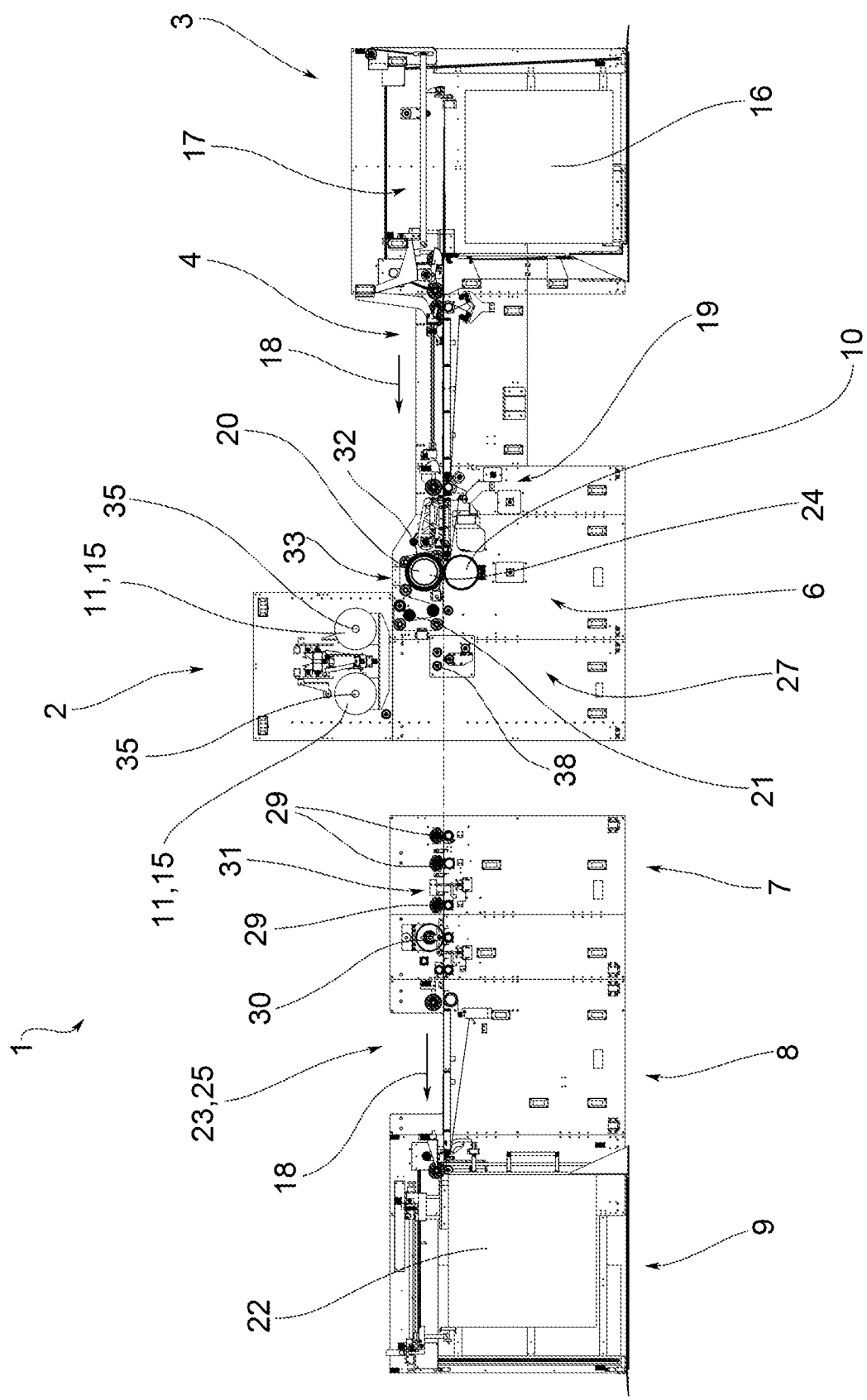
FIG. 2 shows a side view in longitudinal section of a plant for laminating cardboard, according to a further embodiment of the invention.
Figure 3:
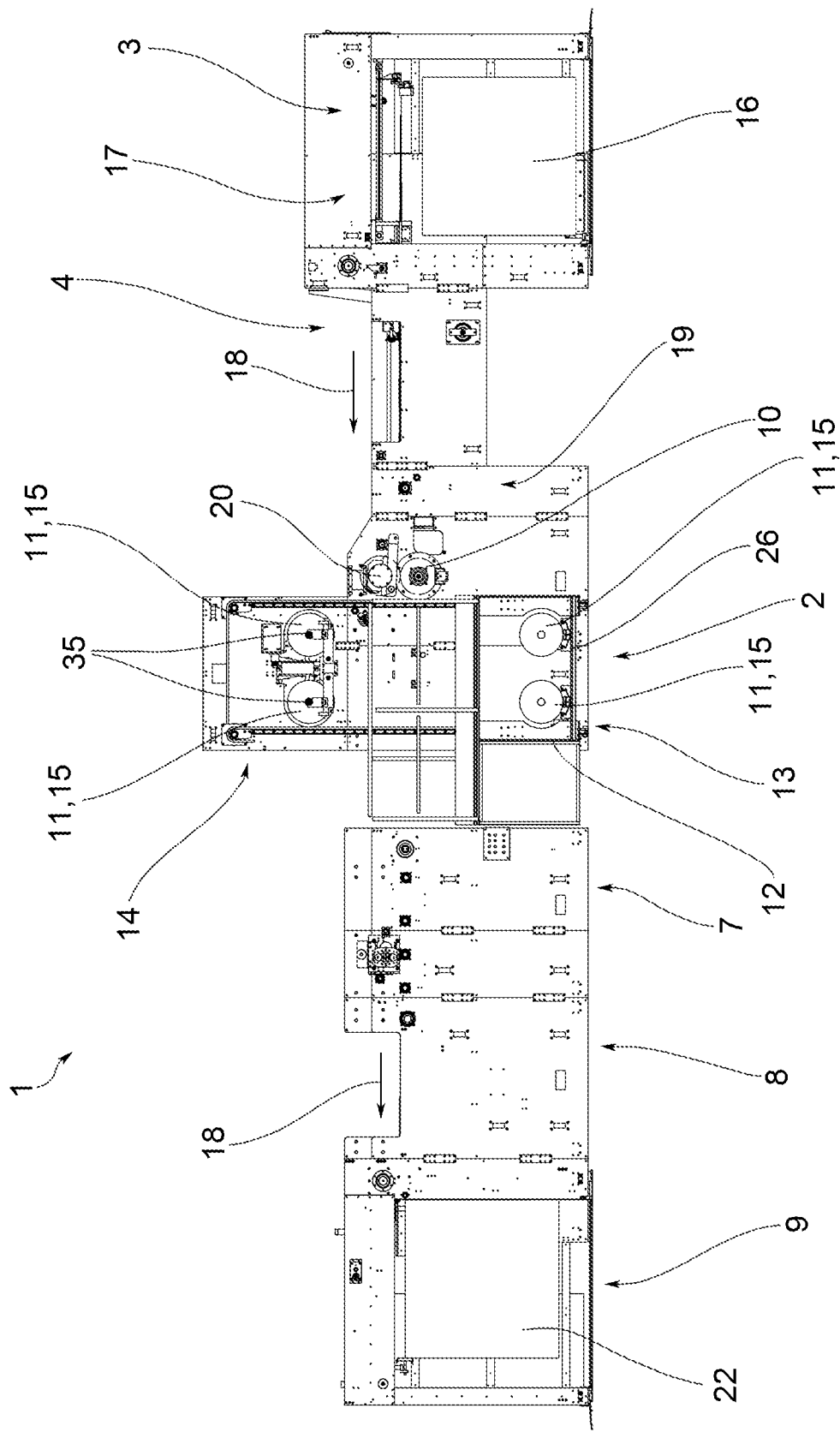
FIG. 3 shows a side view of a plant for laminating cardboard, according to a further embodiment of the invention.
Figure 4:
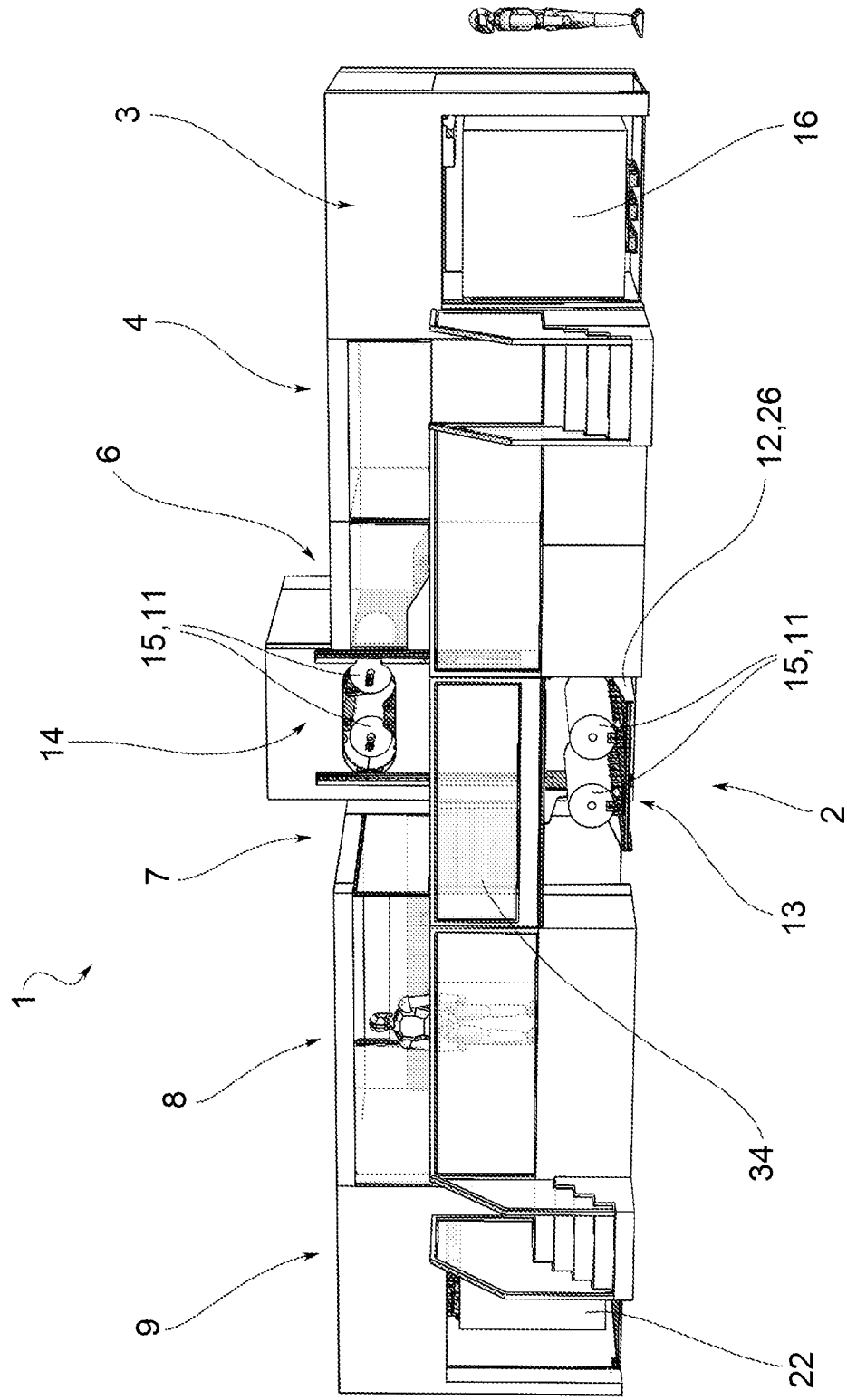
FIG. 4 shows a perspective figure of a plant for laminating cardboard, according to an embodiment of the invention.
Figure 5:
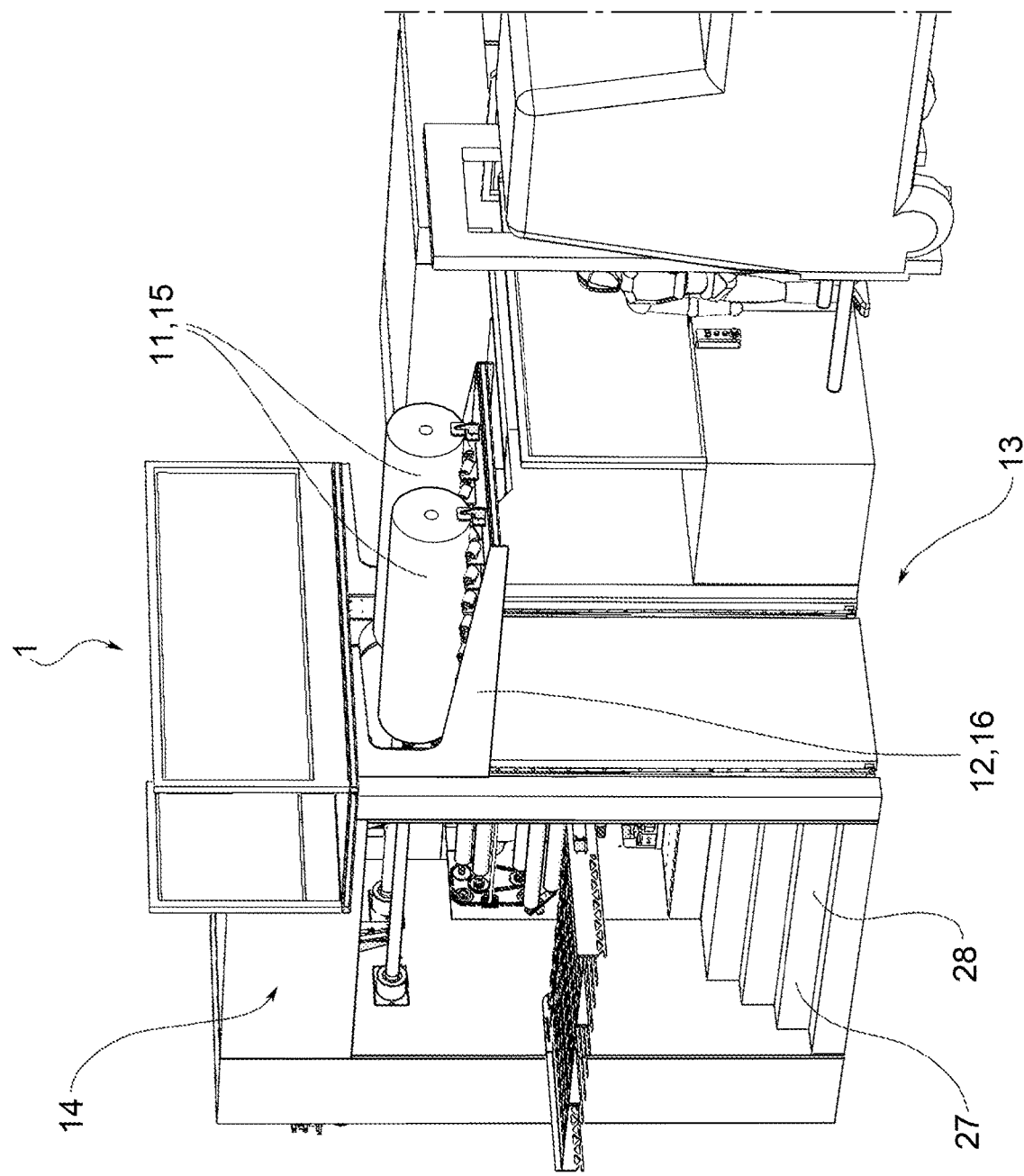
FIG. 5 shows a perspective view of a detail of a plant for laminating cardboard, according to an embodiment of the invention.

With reference to the Figures, a plant for laminating cardboard, and in particular corrugated cardboard, by means of an adhesive plastics film 11, is generally indicated with reference numeral 1.

Adhesive plastics film 11 means a plastics film on which a layer of heat-activated adhesive material is applied.

The plant 1 comprises a supply station 3.

Preferably, the supply station 3 is configured to allow stacking a pile of rough cardboard sheets 16 to be processed.

Rough cardboard sheet 16 means a printed and/or corrugated cardboard sheet 16.

The supply station 3 comprises supplying means 17 of rough cardboard sheets 16 in a feeding direction 18. Preferably, the supplying means 17 comprise a sheet feeder head.

The sheet feeder head 17 is configured to take, in sequence, i.e. one by one, a single rough cardboard sheet 16 of the stack of cardboard sheets to be processed 16, and feed a succession of single rough cardboard sheets 16 in a feeding direction 18.

The plant further comprises an application station 6, arranged in the feeding direction 18.

The application station 6 comprises an application roller 20 which comprises heating means 24.

The application roller 20 is configured to be partially wrapped by the adhesive plastics film 11.

Furthermore, the application roller 20 is structured to be thermally activated, by means of the heating means 24, and in turn reactivate the partially wrapped adhesive plastics film 11.

Furthermore, the application roller 20 is configured to apply the thermally activated adhesive plastics film 11 to the rough cardboard sheet 16 so that the adhesive plastics film 11 adheres to the rough cardboard sheet 16 in order to form a coated cardboard sheet 22. Advantageously, the adhesive plastics film 11 is applied to, and adheres to each rough cardboard sheet 16 placed in sequence, so as to form a succession of coated cardboard sheets 22.

A succession of coated cardboard sheets 22 means a succession of single coated cardboard sheets with a continuous adhesive plastics film.

Furthermore, the application roller 20 is configured to advance the coated cardboard sheet 22, advantageously each coated cardboard sheet 22 of the succession of coated cardboard sheets 22, in the feeding direction 18.

Advantageously, a plant 1 thereby configured, ensures a lamination of the rough cardboard 16 directly onto the corrugated material by means of an adhesive plastics film 11, without the interposition of printed sheets, which reduces processing times and costs, and does not require passages in other machinery, with a consequent reduction of labor costs.

With a further advantage, a plant 1 thus configured achieves a high-quality lamination, which preserves the corrugated structure and the physical properties of the corrugated cardboard.

Advantageously, the plant 1 thus configured may be directly fed with corrugated cardboard sheets, and produces, as a final product, a sheet of corrugated cardboard optimally coated with a plastics film.

According to an embodiment of the invention, the plant 1 for laminating cardboard comprises a loading station 2.

The loading station 2 comprises loading means 12 configured to move at least one bobbin of adhesive plastics film 15 from a storage position 13, in which the at least one bobbin of adhesive plastics film 15 is loadable, to an unwrapping position 14, in which the bobbin of adhesive plastics film 15 unwraps the adhesive plastics film 11.

According to an embodiment, the plant 1 further comprises a feeding and registration station 4, arranged in the feeding direction 18 between the supply station 3 and the application station 6.

The feeding and registration station 4 comprises feeding and alignment means 19 which are configured for moving and aligning the cardboard sheets 16 to be processed, in the feeding direction 18 and/or transversally to the feeding direction 18.

Thereby, the possible micro-misalignments, that the rough cardboard sheets 16 fed by the sheet feeder head 17 may have, are obviated.

According to an embodiment, the plant 1 further comprises a separating station 7, arranged in the feeding direction 18, downstream of the application station 6.

The separating station 7 comprises separation means 5 for separating the succession of coated cardboard sheets 22, at the contact zone between two consecutive coated cardboard sheets 22.

Thereby, a sequence of single and individual coated cardboard sheets 22 is obtained.

According to an embodiment, the plant 1 further comprises a stacking station 9, arranged in the feeding direction 18 downstream of the separating station 7, and configured to stack a pile of coated cardboard sheets 22.

According to an embodiment, the application station 6 comprises a drawing-in system 21, comprising a plurality of tension rollers.

Advantageously, the plurality of tension rollers reduces the wrinkles of the adhesive plastics film 11 unwrapped from the bobbin of adhesive plastics film 15.

The drawing-in system 21 is structured to wrap the adhesive plastics film 11 unwrapped from the bobbin of adhesive plastics film 15, around the application roller 20.

According to an embodiment, the plant 1 for laminating cardboard further comprises a launching station 8, arranged in the feeding direction 18 and interposed between the separating station 7 and the stacking station 9.

The launching station 8 comprises launching means 23 configured to distance, in the feeding direction 18, a single coated cardboard sheet 22 from the following one, so as to create a space between the various coated sheets 22.

Advantageously, this allows to isolate a single coated cardboard sheet 22, and to facilitate a following stacking step.

According to an advantageous embodiment, the launching means 23 comprise suction means 25, which accelerate and subsequently decelerate a single coated cardboard sheet 22, so as to temporarily distance it from the succession of coated cardboard sheets 22.

Loading Station 2

According to an embodiment, the loading station 2 comprises a motorized platform 26.

The motorized platform 26 may be moved between the storage position 13 and the unwrapping position 14.

Furthermore, the motorized platform 26 is configured to support at least one bobbin of adhesive plastics film 15, preferably two.

According to a preferred embodiment, the storage position 13 is located at the plant 1, at ground level.

Advantageously, this simplifies and increases the safety of the process for storing bobbins of adhesive plastics film 15, of considerable weight, to be fed to the plant 1.

Furthermore, the unwrapping position 14 is located at the plant 1, at a higher level with respect to the storage position 13, in a top zone of the plant 1.

Advantageously, this simplifies the process for unrolling the bobbin of adhesive plastics film 15, since the unwrapping position 14 is at a higher level with respect to the drawing-in system 21 which then feeds the application roller 20.

According to an embodiment, the plant 1 forms a calender access chamber 27.

The calender access chamber 27 extends inside the plant 1 and is configured to allow the access of operators inside the plant 1, and in particular the access inside the drawing-in system 21.

The plant 1 also forms an entrance 28, for the access from the outside to the calender access chamber 27.

The entrance 28 is formed at the storage position 13.

When the motorized platform 26 is in the storage position 13, the motorized platform 26 overlaps the entrance 28, preventing the access to the calender access chamber 27.

When the motorized platform 26 is in the unwrapping position 14, the motorized platform 26 opens the entrance 28, thus allowing the access to the calender access chamber 27.

Advantageously, such configuration reduces the size of the plant 1, since the calender access chamber 27 is formed inside the plant 1, and, at the same time, it increases the safety of the plant 1, since the motorized platform 26 may prevent the access to the calender access chamber 27, which, being inside the plant 1, is in any case a zone more exposed to the risk of accidents.

According to an embodiment, a gangway 34 is connected integral with the motorized platform 26, and is positioned above the motorized platform 26.

The gangway 34 allows the passage of operators, when the motorized platform 26 is in the storage position 13.

According to an embodiment, the loading station 2 comprises, at the unwrapping position 14, at least one unwrapping reel 35 and a telescopic loading arm 36.

Advantageously, two unwrapping reels 35 are provided, so as to increase the efficiency and speed of the coating process.

The telescopic loading arm 36 is configured to extend telescopically when the motorized platform 26, carrying the at least one bobbin of adhesive plastics film 15, is at the unwrapping position 14, to harpoon the at least one bobbin of adhesive plastics film 15 and to slip it onto the at least one unwinding reel 35 in the unwrapping position 14.

According to an embodiment, the loading station 2 comprises a height adjustor configured to adjust the height of the motorized platform 26 carrying the bobbins of adhesive plastics film 15.

Advantageously, by means of the height adjuster it is possible to adjust the height at which the bobbins of adhesive plastics film 15 are located, so as to facilitate the loading thereof on the unwrapping reels 35 by means of the telescopic loading arm 36.

According to an embodiment, the loading station 2 comprises, at the unwrapping position 14, a trimming system 37 configured to trim the adhesive plastics film 11 unrolled from the bobbin of adhesive plastics film 15.

Advantageously, by means of the trimming system 37 it is possible to adjust the width of the adhesive plastics film 11 to be conveyed towards the application roller 20, so that the width of the adhesive plastics film 11 conforms to the width of the rough cardboard sheet 16 to be coated.

Supply Station 3

According to an embodiment, the sheet feeder head 17 comprises suction cups adapted to take a single rough cardboard sheet 16, without damaging or deforming the corrugations of the rough cardboard 16.

Furthermore, the sheet feeder head 17 comprises a dividing element, configured to block the pile of rough cardboard sheets 16 during the taking of the upper rough cardboard sheet 16, preventing further rough cardboard sheets 16 from being taken together with the upper sheet.

Feeding and Registration Station 4

According to an embodiment, the feeding and alignment means 19 comprise an overlap management system.

The overlap management system is configured to adjust the overlap and/or the spacing of the ends of two consecutive rough cardboard sheets 16.

Advantageously, according to the type of rough cardboard 16 to be processed, the overlap management system is configured to overlap the ends of the cardboard sheets 16, in case it is required to overlap them, or to space them, in case this is not required.

Application Station 6

According to an embodiment, the application station 6 comprises a counter-deformation system 38, arranged downstream of the application roller 20 in the feeding direction 18.

The counter-deformation system 38 comprises a plurality of deflection rollers configured to convey the coated cardboard sheet 22 exiting the application roller 20 and to press it, so as to obviate any flatness defects of the coated cardboard sheet 22.

In fact, the thermal application of the adhesive plastics film 11 on the rough cardboard sheet 16 may possibly cause a deformation of the resulting coated cardboard sheet 22 which would be obviated by the counter-deformation system 38.

According to an embodiment, the application roller 20 is coated with an elastic material 32, preferably in rubber.

Advantageously, by means of the elastic material 32, the application roller 20 uniformly applies the adhesive plastics film 11 so as to accommodate the roughness and corrugations of the rough cardboard sheet 16 to be coated, without damaging it.

According to an embodiment, the application station 6 comprises height adjustment means 33 configured to adjust the height of the application roller 20, with respect to the rough cardboard sheet 16.

Advantageously, the adjustment of the height of the application roller 20 allows to predetermine the compression force that the application roller 20 will implement in coating the rough cardboard sheet 16 with the adhesive plastics film 11.

Thereby, the application roller 20 efficiently applies the adhesive plastics film 11 to the rough cardboard sheet 16 with an adequate compression rate, without however damaging or deforming the corrugations of the rough cardboard sheet 16.

According to an embodiment, in the operating configuration, the adhesive plastics film 11 wraps around about ¾ of the outer surface of the application roller 20.

According to an embodiment, the application roller 20 heats the adhesive plastics film 11 up to a temperature between 80° C. and 120° C.

Advantageously, this allows to effectively heat and activate the adhesive layer of the adhesive plastics film 11, while reducing the size of the plant 1, since the heating is provided by means of a single component, i.e., the application roller 20.

According to an embodiment, the application station 6 comprises a pressure roller 10, opposite to the application roller 20 with reference to the adhesive plastics film 11. Preferably, the pressure roller is made of a rigid material.

The pressure roller 10 is configured to counter pressure the application roller 20 when conveying the coated cardboard sheet 22 in the feeding direction 18.

According to an embodiment, both the application roller 20 and the pressure roller 10 are motorized.

Advantageously, the motorization of both the application roller 20 and the pressure roller 10 allows to reduce the pressure force acting on the coated cardboard sheet 22 to convey it in the feeding direction 18, so as not to damage or deform the corrugations of the coated cardboard sheet 22.

Separating Station 7

According to an embodiment, the separating station 7 comprises no-crush wheels 29, which are configured to drag the coated cardboard sheets 22 in the feeding direction 18.

Advantageously, the use of no-crash wheels 29 ensures a dragging which does not damage or deform the coated cardboard sheets 22 directed in the feeding direction 18.

According to an embodiment, the separating station 7 comprises an end sheet detector 31.

The end sheet detector 31 is configured to detect a separation zone between two consecutive coated cardboard sheets 22, and control the separation means 5 to cut the plastic coating on the end part of the coated cardboard sheets 22.

According to an embodiment, the end sheet detector 31 is configured to detect the separation zone between two consecutive coated cardboard sheets 22, both in case the two coated cardboard sheets 22 are detached and in case they slightly overlap, or in case of overlap. Therefore, separation zone means the zone of detachment and/or overlap between two consecutive coated cardboard sheets 22.

According to an embodiment, the separation means 5 comprise a flying shear system 30 comprising a thermal knife, configured to make the cut according to the commands of the end sheet detector 31. The flying shear system 30 is configured to adjust the speeds of rotation of the thermal knife with respect to a rotation axis orthogonal to the feeding direction 18. The flying shear system 30 is configured to adjust the height and the inclination of the thermal knife with respect to the plane of the coated cardboard sheets 22.

Alternatively, the separation means 5 comprise a cold-cutting system, configured to perform the cut on the basis of the commands from the end sheet detector 31 and comprising a blade configured to slide in the transverse and/or diagonal direction with respect to the plane of the coated cardboard sheets 22, depending on whether or not the coated cardboard sheets 22 are temporarily stopped during the cutting, at the separation zone between the coated cardboard sheets 22.

Advantageously, the use of a flying shear system 30 reduces the overall size of the plant 1 and ensures a precise cut, with an accuracy of a tenth of a millimeter.

According to a preferred embodiment, the adhesive plastics film 11 consists of polypropylene or polyester or polylactic acid (PLA) or nylon or polyethylene.

Method for Laminating Cardboard

According to a further aspect of the invention, a method for laminating cardboard, and in particular corrugated cardboard, using an adhesive plastics film 11, comprises the following steps:

Having a plant 1 for laminating cardboard, as described above.

In a loading station 2, storing at least one bobbin of adhesive plastics film 15 in a storage position 13 and moving the bobbin of adhesive plastics film 15 from the storage position 13 into an unwrapping position 14.

Unwrapping the adhesive plastics film 11 from the bobbin of adhesive plastics film 15 and conveying the adhesive plastics film 11 to a drawing-in system 21 and to an application roller 20.

In a supply station 3, taking a rough cardboard sheet 16, preferably from a pile of rough cardboard sheets 16 that is stacked in the supply station 3, and supplying the rough cardboard sheet 16 in a feeding direction 18.

In a feeding and registration station 4, moving and registering the rough cardboard sheet 16 in the feeding direction 18 towards the application roller 20 and adjusting the overlap and/or spacing between the ends of two consecutive rough cardboard sheets 16 by means of an overlap management system.

In an application station 6, heating the application roller 20, thermally activating the adhesive plastics film 11 and storing the thermally activated adhesive plastics film 11 on the rough cardboard sheet 16 so that the adhesive plastics film 11 adheres to the rough cardboard sheet 16, advantageously to each rough cardboard sheet 16 of the succession of rough cardboard sheets 16, so as to form a coated cardboard sheet 22, advantageously a succession of coated cardboard sheets 22, and releasing each coated cardboard sheet 22 in the feeding direction 18.

In a separating station, separating two consecutive coated cardboard sheets 22, preferably by cutting the succession of coated cardboard sheets 22 at a separation zone between two consecutive coated cardboard sheets 22, so as to obtain a sequence of single and individual coated cardboard sheets 22.

In a stacking station 9, stacking the pile of coated cardboard sheets 22.

According to an advantageous embodiment, in a launching station 8 arranged between the separating station 7 and the stacking station 9, a space is created between a single coated cardboard sheet 22 and the subsequent coated cardboard sheets that follow it.

According to an embodiment, the conveying and fixing of the adhesive plastics film 11 on the drawing-in system 21 is performed manually, by an operator.

According to an embodiment, only at the beginning of the manufacturing process, the succession of coated cardboard sheets 22 is manually conveyed to the separating station 7 by an operator.

Advantageously, the conveyance performed manually by an operator simplifies plant 1 and reduces the costs for the manufacturing thereof.

Obviously, those skilled in the art will be able to make modifications or adaptations to the present invention, without however departing from the scope of protection of the claims below.

The invention claimed is:

1. A plant for laminating cardboard by an adhesive plastic film, comprising:
   a supply station that comprises supplying means of rough cardboard sheets in a feeding direction;
   an application station arranged in the feeding direction and comprising an application roller that comprises heating means; and
   a loading station that comprises:
      loading means configured to move at least one bobbin of adhesive plastics film from a storage position, in which the at least one bobbin of adhesive plastics film can be stored, into an unwrapping position, in which the at least one bobbin of adhesive plastics film unwraps the adhesive plastic film, the loading;
      a motorized platform that is movable between the storage position and the unwrapping position and is configured to support the at least one bobbin of adhesive plastics film;
      at the unwrapping position, at least one unwrapping reel and a telescopic loading arm, wherein the telescopic loading arm is configured to extend telescopically when the motorized platform carrying the at least one bobbin of adhesive plastics film is at the unwrapping position, to harpoon the at least one bobbin of adhesive plastics film and place it onto the at least one unwinding reel in the unwrapping position;
   a calender access chamber extending inside the plant and configured to allow access of operators inside the plant; and
   an entrance for access from outside to the calender access chamber, wherein the entrance is formed at the storage position;
   wherein the application roller is configured to be partly wrapped in the adhesive plastics film to thermally activate, by the heating means, the adhesive plastics film which is partly wrapped around said application roller, in order to unwrap and apply the thermally activated adhesive plastics film to a rough cardboard sheet so that the adhesive plastics film adheres to the rough cardboard sheet to form a coated cardboard sheet and to advance the coated cardboard sheet along the feeding direction;
   wherein when the motorized platform is in the storage position, the motorized platform overlaps the entrance, preventing access to the calender access chamber; and
   wherein when the motorized platform is in the unwrapping position, the motorized platform opens the entrance, thus allowing access to the calender access chamber.

2. The plant of claim 1, comprising a feeding and registration station arranged in the feeding direction between the supply station and the application station, and comprising feeding and alignment means configured to move and register orientation of the rough cardboard sheet in the feeding direction.

3. The plant of claim 1, comprising a separating station arranged in the feeding direction, downstream of the application station, and comprising separation means for cutting a succession of coated cardboard sheets in a separation zone between two consecutive coated cardboard sheets to obtain a sequence of single and individual coated cardboard sheets.

4. The plant of claim 3, comprising a stacking station arranged in the feeding direction, downstream of the separating station and configured to stack a pile of coated cardboard sheets.

5. The plant of claim 1, wherein the application station comprises a drawing-in system that comprises a plurality of tension rollers, and wherein the drawing-in system is structured to wrap the adhesive plastics film, which is unwrapped from a bobbin of adhesive plastics film, around the application roller.

6. The plant of claim 4, comprising a launching station arranged in the feeding direction and interposed between the separating station and the stacking station, said launching station comprising launching means configured to create a gap, in the feeding direction, between a single coated cardboard sheet so as to space the single coated cardboard sheet apart from the succession of coated cardboard sheets.

7. The plant of claim 1, wherein the storage position is located in the plant at ground level, and the unwrapping position is located in the plant at a higher level than the storage position in a top zone of the plant.

8. The plant of claim 1, wherein the loading station comprises a height adjustor configured to adjust height of the motorized platform carrying the at least one bobbin of adhesive plastics film.

9. The plant of claim 1, wherein the loading station comprises, at the unwrapping position, a trimming system configured to trim the adhesive plastics film unrolled from the at least one bobbin of adhesive plastics film.

10. The plant of claim 2, wherein the feeding and alignment means comprise an overlap management system that is configured to adjust overlap and/or spacing between ends of two successive rough cardboard sheets.

11. The plant of claim 1, wherein the application station comprises a counter-deformation system arranged downstream of the application roller in the feeding direction, said counter-deformation system comprising a plurality of deflection rollers configured to convey and press the coated cardboard sheet leaving the application roller.

12. The plant of claim 1, wherein the application roller is coated with an elastic material.

13. The plant of claim 1, wherein the application station comprises height adjustment means configured to adjust height of the application roller.

14. The plant of claim 1, wherein the application roller is configured to heat the adhesive plastics film to a temperature ranging between 80° C. and 120° C.

15. The plant of claim 1, wherein the application station comprises a pressure roller opposite the application roller, said pressure roller being configured to exert a counter pressure to the application roller when conveying the coated cardboard sheet in the feeding direction, and wherein both the application roller and the pressure roller are motorized.

16. The plant of claim 3, wherein the separating station comprises no-crush wheels configured to drag the coated cardboard sheets in the feeding direction.

17. The plant of claim 3, wherein the separating station comprises an end sheet detector configured to detect the separation zone between two consecutive coated cardboard sheets and to command the separation means to make a cut in the separation zone between two consecutive coated cardboard sheets.

18. The plant of claim 17, wherein the separation means comprise:

a flying shear system comprising a thermal knife, said flying shear system being configured to perform the cut on the basis of commands from the end sheet detector, to adjust rotational speed of the thermal knife with respect to an axis of rotation that is orthogonal to the feeding direction, and to adjust height and inclination of the thermal knife with respect to a plane of the coated cardboard sheets;

or a cold-cutting system configured to perform the cut on the basis of commands from the end sheet detector and comprising a blade configured to slide in transverse and/or diagonal direction with respect to the plane of the coated cardboard sheets in the separation zone between two consecutive coated cardboard sheets.

19. The plant of claim 1, wherein the adhesive plastics film consists of one of polypropylene, polyester, polylactic acid (PLA), nylon or polyethylene.

20. A method for laminating cardboard using an adhesive plastics film, comprising:

providing a plant for laminating cardboard according to claim 1;

in a loading station, storing at least one bobbin of adhesive plastics film in a storage position and moving the at least one bobbin of adhesive plastics film from the storage position into an unwrapping position;

unwrapping the adhesive plastics film from the at least one bobbin of adhesive plastics film and conveying the adhesive plastics film to a drawing-in system and to an application roller;

in a supply station, taking a rough cardboard sheet that is stacked in the supply station and supplying the rough cardboard sheet in a feeding direction;

in a feeding and registration station, moving and registering the rough cardboard sheet in the feeding direction towards the application roller and adjusting overlap and/or spacing between ends of two consecutive rough cardboard sheets by an overlap management system;

in an application station, heating the application roller, thermally activating the adhesive plastics film and depositing the thermally activated adhesive plastics film on the rough cardboard sheet so that the adhesive plastics film adheres to the rough cardboard sheet to form a coated cardboard sheet, and releasing the coated cardboard sheet in the feeding direction;

in a separating station, separating two consecutive coated cardboard sheets in a separation zone so as to obtain a sequence of single and separate coated cardboard sheets; and in a stacking station, stacking the coated cardboard sheets;

wherein, when the motorized platform is in the storage position, the motorized platform overlaps the entrance, preventing access to the calender access chamber; and wherein, when the motorized platform is in the unwrapping position, the motorized platform opens the entrance, thus allowing access to the calender access chamber.

21. The method of claim 20, further comprising, in a launching station arranged between the separating station and the stacking station, creating a gap to space a single coated cardboard sheet from a succession of subsequent coated cardboard sheets.

22. The method of claim 20, wherein the adhesive plastics film is manually conveyed and fixed to the drawing-in system by an operator, and wherein a succession of coated cardboard sheets is manually conveyed from the application station towards the separating station by the operator.

\* \* \* \* \*